Feb. 16, 1960 W. E. HASTINGS 2,924,923
APPARATUS FOR IMPRINTING PLASTIC MATERIAL
Filed June 9, 1953 3 Sheets-Sheet 1
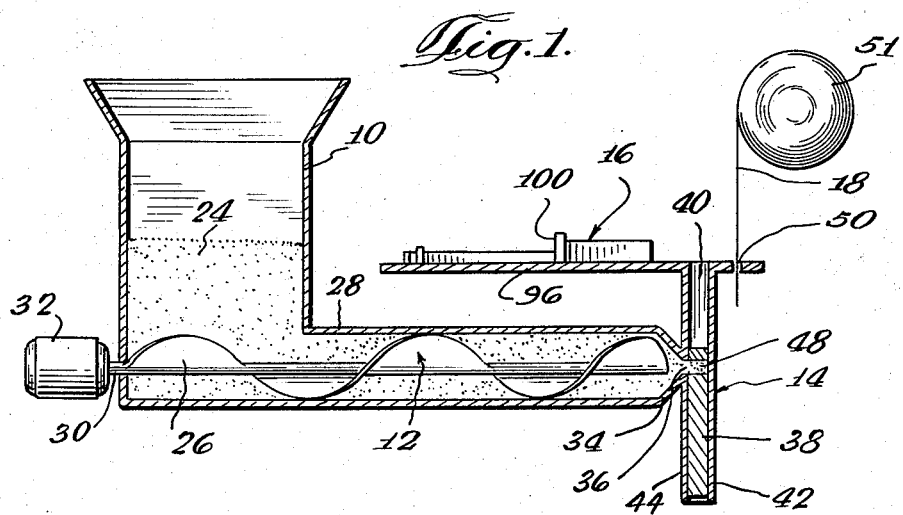
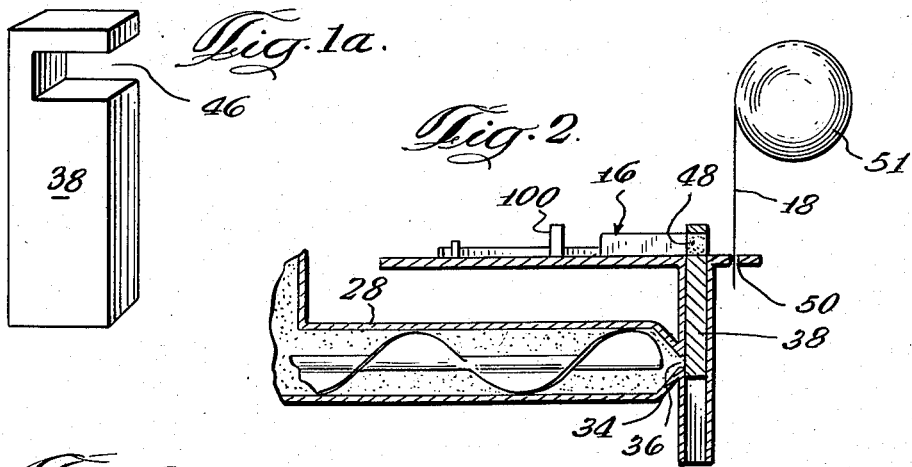
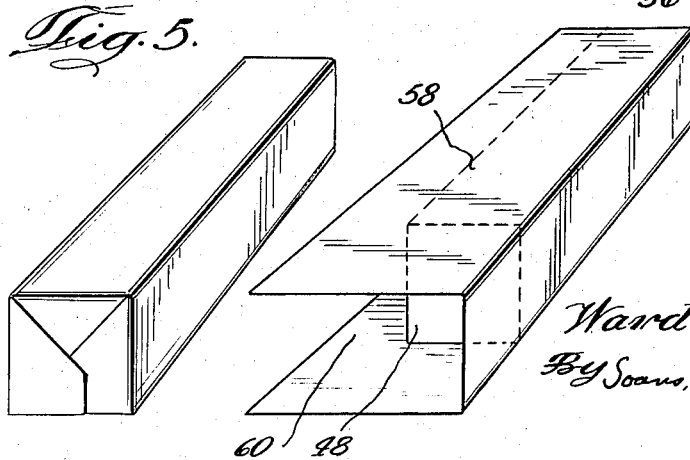
Inventor
Ward E. Hastings
By Soans, Glausi &
Anderson
Attorneys

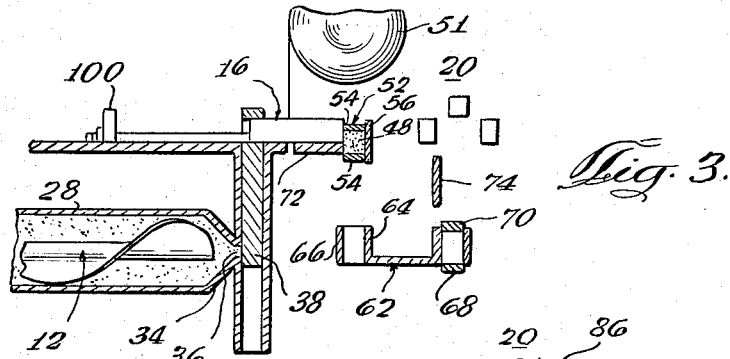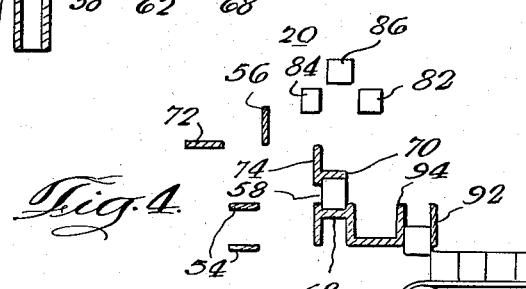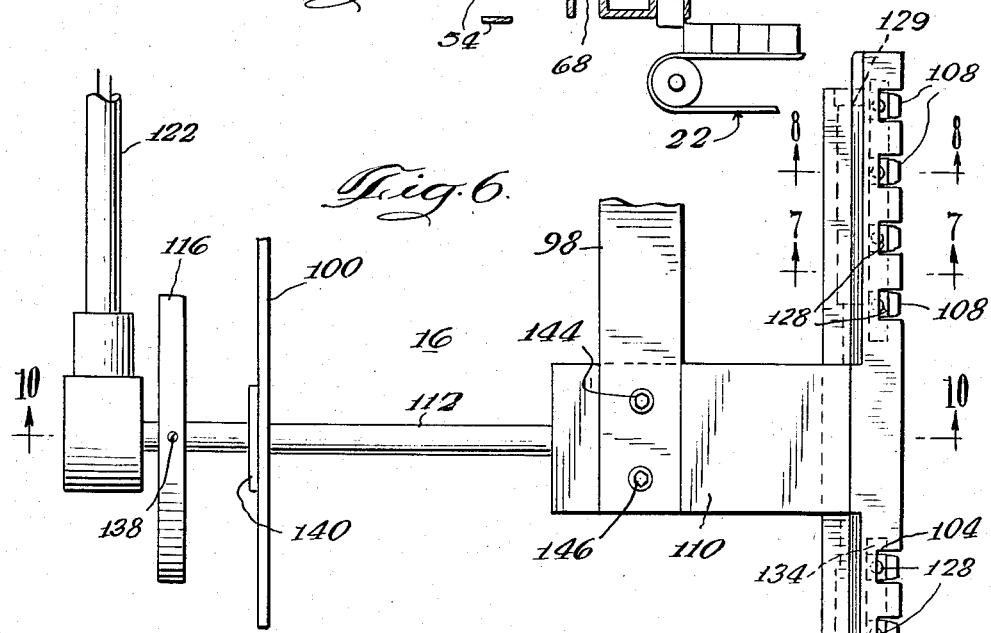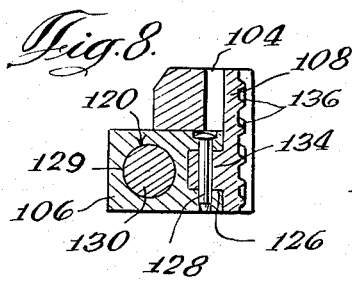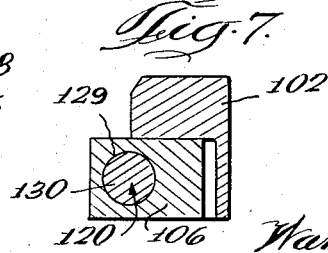

Feb. 16, 1960 W. E. HASTINGS 2,924,923
APPARATUS FOR IMPRINTING PLASTIC MATERIAL
Filed June 9, 1953 3 Sheets-Sheet 3
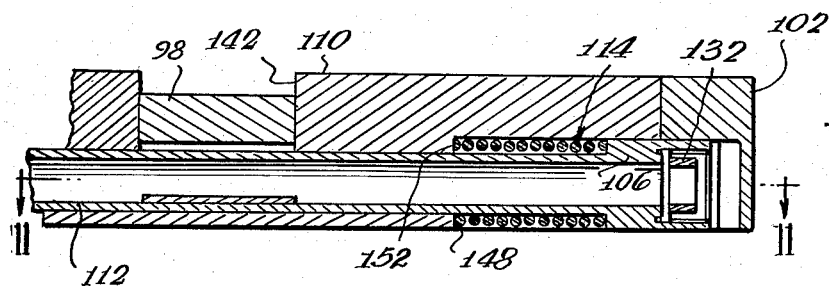
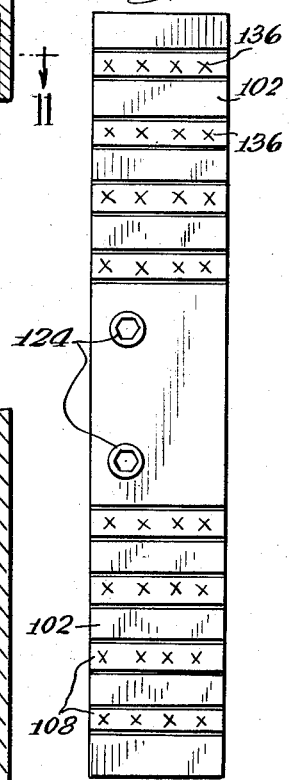
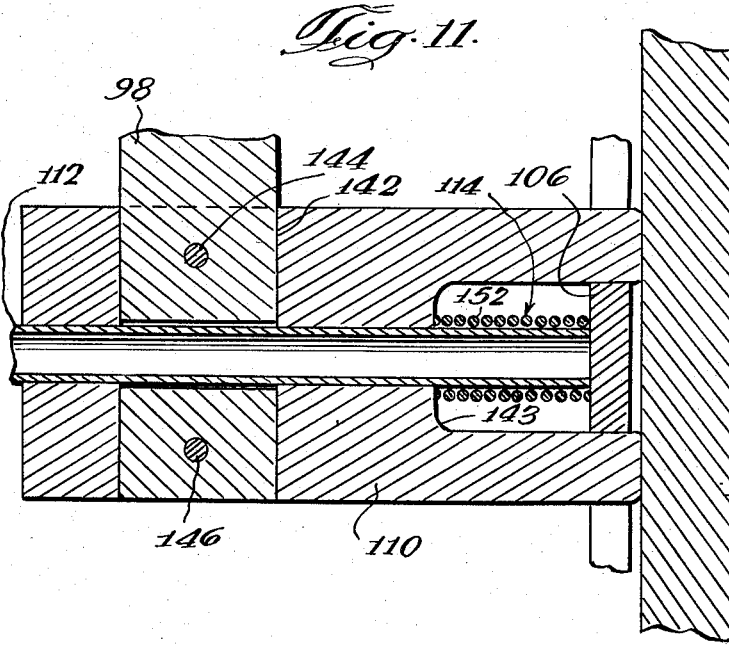
Inventor
Ward E. Hastings
By Soans, Meister & Anderson
Attorneys

United States Patent Office 2,924,923
Patented Feb. 16, 1960

2,924,923

APPARATUS FOR IMPRINTING PLASTIC MATERIAL

Ward E. Hastings, Crystal Lake, Ill., assignor to National Dairy Products Corporation, a corporation of Delaware Application June 9, 1953, Serial No. 360,451

2 Claims. (Cl. 53—111)

The present invention relates generally to the packaging of plastic materials, and more particularly, it relates to printing of figures on plastic materials, such as butter and margarine, during packaging of these materials.

Machine forming and wrapping of plastic materials into units of one-quarter pound and one pound sizes has become relatively standardized. This is particularly true in the case of the forming and wrapping of butter and margarine. In the latter connection, it is claimed that 90 percent of the butter and margarine made in the United States which are formed and wrapped is so done upon machines sold by Lynch Package Machinery Corporation of Toledo, Ohio.

In the Lynch machines, a plastic material is fed into a hopper and down into a positive feed-in unit. This feed-in unit forces the material through a molding head having an opening formed therein which is proportional to one dimension of the unit of material to be formed. The material is received in a die which moves in a passageway, the die and passageway defining a shape which is the same as the shape of the unit of material to be packaged and which is the shape of a rectangular bar.

In the machine, the die moves upwardly to a platform and a push unit ejects the bar of material from the die and pushes the bar against a sheet of wrapping material, causing the sheet to wrap around the top, bottom, and one side of the bar and to have portions which extend from the top and bottom of the box. The push unit then forces the partially wrapped bar into a receiving head, which head moves downwardly along the face of the push unit and causes the bottom extending portion of the wrapping material to be pushed up against the uncovered side of the unit of material, this being accomplished by means of a striker edge.

The partially wrapped bar is moved downwardly into an open topped receiver and is ejected from the receiving head in its lower position by moving the partially wrapped material transversely with respect to the receiving head. The upper extended portion of the wrapping material is then wrapped onto the partially uncovered side by moving the partially wrapped bar upwardly past a striker bar which folds down the extended portion of the wrapper. The end flaps of the wrapping material are closed around the end of the bar by the machine. The wrapped bar is then packaged, as desired, and stored or shipped.

This unit has proved highly satisfactory in operation and is capable of handling as much as 3600 pounds per hour.

It has been considered desirable for advertising and other purposes to print figures, such as designs or lettering material, on the sides of the bar of material on the available machines. Various attempts have been made to accomplish this and such attempts have included separating the bar forming function from the wrapping operation, the bar being printed intermediate the performance of these steps. Such an operation is not adapted to the existing machines and is quite costly.

It has also been attempted to prepare wrapping material embossed with printed matter or design so that when the bar of material is wrapped, the embossed design on the wrapper will appear on the bar. In place of embossing the wrapper, it has been suggested that an edible dye be printed onto the wrapper, which dye would be transferred to the bar of material. Embossing of the wrapper is considered unsatisfactory because of the expense involved and because it tends to weaken the wrapper. The use of edible dye is also unsatisfactory as it does not effectively transfer to the bar and it does not provide a pleasing appearance.

In addition, imprinting of the bar has been attempted by perforating the wrapping on the bar with the figure. This is unsatisfactory because it perforates the wrapper so that dirt or extraneous matter is available to the plastic material and if this is to be eliminated, it is necessary to apply an overwrap, thereby prohibitively increasing the cost of wrapping the margarine.

It has been suggested that figures be embossed onto the face of the push unit thereby forming recessed figures in the bar and that the figures be embossed on the bar by forming recessed figures in the push unit. This has not been considered possible on the existing machinery for the reason that if convex material is placed upon the face of the push unit, it will be sheared off by the receiving head when it is moved downwardly. Furthermore, in such arrangement, the figure will be damaged as the bar is moved downwardly. In the alternative, if a concave figure is formed in the push unit, the figure, which will be embossed on the bar, will be erased when the receiving head moves into the lower position and the wrapping material is folded about the bar.

In view of the substantial capital investment in the existing machinery and in view of the desirability of placing printed matter or designs in plastic materials wrapped on such machinery, a principal object of the present invention is the provision of means for imprinting figures in plastic substances on existing machines.

As will become more apparent hereinafter, this and other objects of the invention are accomplished by the provision of a push unit having a stamp which is movable into and out of the face of the push unit so that the bar may be imprinted while being pushed onto the wrapper and receiving head but may be retracted into the face of the push unit when the bar is lowered to wrap an extended portion of the wrapping material around the unwrapped side of the bar, as above described.

In the drawings, the various elements of existing machinery for forming and wrapping plastic material are well known and are schematically in various of the drawings but the details of the push unit are novel and are, therefore, shown in detail in the drawings. In the drawings:

Figure 1 is a schematic drawing, partially in cross-section, of a section of a packaging machine for forming and wrapping bars of plastic material, the section being of that portion of the machine wherein the bar is first formed.

Figure 1a is a perspective view of the die used in forming a bar of plastic material.

Figure 2 is also a schematic view of the machine, the view being partially in cross-section, and being similar to that shown in Figure 1 but showing the formed bar in position for ejectment by the push unit.

Figure 3 is another partially cross-sectional schematic view of another portion of the machine, the view showing the lower extended portion of the wrapping material being wrapped onto the bar.

Figure 4 is a further schematic view of another portion of the machine, this view showing the upper extended portion of the wrapping material being wrapped around the bar.

Figure 5 is a perspective view of the wrapped bar.

Figure 5a is a perspective view of a partially wrapped bar.

Figure 6 is a plan view of the push unit of the invention.

Figure 7 is a view, in cross-section, taken along lines 7—7 in Figure 6.

Figure 8 is also a view in cross-section, the view being taken along line 8—8 in Figure 6.

Figure 9 is a plan view of the face of the push unit shown in Figure 7.

Figure 10 is a fragmentary, cross-sectional view taken along line 10—10 in Figure 7.

Figure 11 is a fragmentary cross-sectional view taken along line 11—11 in Figure 10.

As above indicated, the present invention is particularly adapted for use in connection with machinery now being commercially used primarily for packaging butter and margarine. This machine is known as the "Morpac" Model T Print Forming and Wrapping Machine, the machine being sold by Lynch Package Machinery Corporation of Toledo, Ohio. Since the machine is generally known, the machine has been illustrated schematically in Figures 1 through 4 in the drawings in order to describe the sequence of operation of the machine and in order to point out the relation of the apparatus of the invention with the machine. The machine comprises a hopper 10, made of stainless steel alloy, which hopper discharges into a positive feed-in unit 12.

The positive feed-in unit feeds the material into a forming unit 14 which molds the plastic material into a bar of the general shape shown in Figure 5. The bar is ejected from the forming unit by a push unit 16 into a sheet of wrapping material 18, whereupon the bar is wrapped with the sheet of wrapping material 18 in the manner shown in Figure 5. This wrapping is accomplished by a wrapping unit 20, which is shown schematically in Figures 3 and 4 of the drawings. The wrapped bar may be discharged onto a conveyor 22 which carries it to a station for packaging into cartons or boxes.

The plastic material 24 may be fed directly into the hopper by hand or from a machine used in the manufacture of the material, such as a Votator, and down into the feed-in unit 12. The feed-in unit comprises a worm 26 which is carried in a generally cylindrical tube 28. The worm is mounted on a shaft 30 which is driven by a motor 32.

The worm 26 forces the plastic material into a molding head 34 and through an opening 36 in the head. This opening is usually of the same size as one dimension of the bar to be formed, this dimension being the long dimension of the bar. The worm 26 and tube 28 are made of stainless alloy for sanitary purposes, and two worms and tubes may be in side by side relation so as to be capable of forming two bars of plastic material at the same time.

The plastic material discharged through the opening 36 is received into the forming unit 14 which comprises a die 38 and a passage 40 which is defined by walls 42 and 44. The die is shown particularly in Figure 1a and is fabricated from a rectangular block of material which is also preferably a stainless alloy metal, and is cut out to provide an opening 46 which is the same as the size of the bar to be formed. When the opening 46 is filled with the plastic material, a bar 48 is formed and the die is moved upwardly so that the plastic material may be ejected from the die.

The plastic material is ejected from the die after it has been raised to the position shown in Figure 2. It will be noted that as the die is raised, the lower position of the die closes off the opening 36 in the molding head 34 of the feed-in unit 12 and this opening is not opened until the die returns to the position shown in Figure 1 for refilling. When the die is raised to the position shown in Figure 2, the bar of plastic material 48 is ejected from the die by the push unit.

The push unit has been modified in accordance with the principles of the invention in order to print a figure on the bar of plastic material 48 as it is pushed from the die 38. The printing matter is on the face of the push unit, which is more particularly shown in Figures 6 to 11, inclusively. The push unit 16 forces the bar of plastic material into the sheet of wrapping material 18 which is fed down from a roll 51 into an opening 50. As the bar 48 of plastic material presses against the wrapping material 18, a lower portion of the sheet is separated from the continuous strip, the amount separated being sufficient to wrap around the bar. Through this operation, the wrapping material is caused to wrap around one side, the bottom and top of the bar 48, whereupon the bar is fed into the wrapping unit 20.

The wrapping unit 20 comprises a vertically movable receiving head 52 which comprises a pair of horizontally extending vertically spaced plates 54. The receiving head coacts with a vertically extending plate 56 to define a receptacle for receiving a partially wrapped bar from the push unit 16. When the bar is received in the receiving head 52, flaps 58 and 60 extend from the top and bottom of the bar as shown in Figure 5a. The flap 60 underlies the push unit 16, while the flap 58 overlies the push unit 16. When the bar is in the receiving head, the face of the push unit 16, the receiving head 52 and the plate 56 define a rectangular opening of the same area as the cross-section of the bar.

The wrapping unit further includes a receiver 62 which comprises a pair of walls 64 and 66 which are spaced a distance corresponding to one dimension of the bar. The bar is dropped into this receiver by the receiving head 52 and the bar is then moved transversely into a pair of horizontally extending vertically spaced plates 68 and 70 which are spaced apart a distance corresponding to another dimension of the bar. As the bar is lowered by the receiving head, the bottom flap 60 is pulled from beneath the push unit 16 and laid up against the side of the bar by means of a striker plate 72.

The flap 58 of the wrapper is forced downwardly when the bar is moved upwardly by the plates 68 and 70 from the receiver 62. The plates 68 and 70 are adapted to raise the partially wrapped bar upwardly past a striker bar 74 which forces the flap 58 downwardly against the side of the bar, as is shown in Figure 4. The wrapped bar is then raised further to fold the end flaps around the ends of the bar, this being accomplished by means of flap closing plates 82, 84 and 86.

The bar is then received in another portion of the receiver 62 which is defined by plates 92 and 94. The completely wrapped bar is deposited from this portion of the receiver onto the conveyor 22 for carrying the bar to another station for placing into packages or boxes.

It will be seen from the foregoing that as the bar of material 48 is lowered by the receiving head 52 after being pushed from the die 38, the bar 48 rubs across the face of the push unit 16 and moves in close proximity to the striker plate 72, following which it is introduced between plates 64 and 66 of the receiver 62. If the face of the push plate is embossed or hollowed out in the form of a figure, such figure will be imprinted on the bar 48 but will be obliterated by the push plate when the bar is lowered by the receiving head. Furthermore, if the printed matter is embossed on the bar 48, such matter may be destroyed by the striker plate 72 or obliterated when the bar is put between the plates 64 and 66 of the receiver 62. As above pointed out, this invention is particularly directed to printing on the bar 48 of a figure which will not be destroyed by normal machine wrapping of the bar. In accordance with the principles of the invention, the push unit, in operation, stamps a figure on the bar while it is being pushed into the receiving head 52 and causes the stamp to be withdrawn from the face of the push unit prior to lowering of the bar 48 into the receiver 62. More particularly, the stamp is retracted just prior to pushing of the bar in the manner shown in Figure 3, so that the push unit 16 functions in the normal manner but the figure is not damaged when the bar is lowered.

The push unit shown in the drawings is adapted to print two bars at the same time and, therefore, a dual unit is shown in the drawings. The push unit is carried on a plate 96 (Figure 1) and slides back and forth on this plate, the unit being actuated by a bar 98 which is connected to the machine. The unit slides through a guide plate 100 which is fixedly connected to the machine. This plate, as will be seen, coacts with the push unit to retract the stamp in the course of operation.

The push unit 16 comprises a push plate 102 having recesses 104 formed therein and a retractable bar 106 which is movable, in the direction of movement of the push unit, relative to the push plate 102. The retractable bar 106 carries a series of stamps 108 (see Figures 6 and 8) for imprinting the bar of plastic material 48, which stamps are proportioned to retract into the recesses 104. The push plate 102 is connected to a mounting block 110 which slides on the plate 96 of the machine and which is connected to the actuating arm 98 which moves the push unit 16. A connecting rod 112 extends through the mounting block 110 and connects to the retractable bar 106.

The retractable bar 106 is biased towards the push plate by resilient means 114 which extends between the mounting block 110 and the retractable bar 106. A collar 116 (see Figure 6) is carried on the connecting rod 112 at the end away from the retractable bar and this collar 116 is fixedly secured to the connecting rod 112. In operation, the collar 116 engages the fixed guide plate 100 when the push unit is pushed forward thereby causing the retractable bar to be moved rearward against the resilient means 114, thereby retracting the stamps 108 into the recesses 104 of the push plate 102.

The push unit also desirably includes heating means 120 (See Figures 7 and 8) for heating the stamps 108, the heating means having suitable connecting means for connection to a suitable source of electricity.

Now considering the particular structure of the push unit 16 shown in the drawings, the push plate 102 comprises a generally rectangular shaped bar made of a stainless steel alloy, the bar being undercut, as shown in Figures 7 and 8, to receive the retractable bar 106. In the push plate shown in the drawings, a series of vertically extending recesses 104 are formed in the plate to receive the stamps 108. These recesses 104 communicate with the undercut portion of the push plate, as is shown particularly in Figure 8. The push plate is bolted to the mounting block 110 by means of bolts 124, which are countersunk into the face of the push plate 102 (Figure 9).

The retractable bar 106 is generally rectangular in shape (Figures 7 and 8) and is provided with a series of recesses 126 into which the stamps 108 fit. The stamps 108 are keyed to the retractable bar by means of a pin 128 which extends down into an aperture provided in the retractable bar 106 (Figure 8). As shown in the drawings, the retractable bar is hollowed out to provide an opening 129 for receiving heating elements 130, these elements being connected to a terminal board 132 (Figure 10) for connection to a suitable source of electricity.

The stamps 108, as above pointed out, are connected to the retractable bar 106 by a pin 128, and accordingly, the stamps are provided with sections 134 which fit into the retractable bar 106, these sections being provided with holes for receiving the pins 128. The stamps are fabricated from a material which is more heat conductive than the material from which the face plate is formed. In this connection, the stamps 108 are preferably fabricated from pure tin. Of course, the figures 136 are embossed onto the face of the stamps.

The retractable bar 106 is threadedly connected to the rod 112, the rod extending generally perpendicularly to the bar and through the block 110. At the outer end of the rod 112, the collar 116 is mounted, the collar being fixedly secured to the rod by means of a set screw 138. The rod 112 is guided through guide plate 100 (Figures 1 and 6) and a stop pad 140 may be carried on the rod 112 between the plate 100 and collar 116 so that when the push unit 16 moves forwardly, the pad 140 absorbs some of the shock when the collar contacts the pad.

As pointed out, the mounting block 110 is bolted to the push plate 102 by bolts 124 and the rod 112 which connects to the retractable bar extends through the block 110. The block 110 is generally rectangular in shape and is provided with a recess 142 for receiving the actuating arm 98 (Figures 10 and 11), the arm being bolted to the block 110 by bolts 144, 146.

The block 110 is also provided with a recess 148 for receiving the resilient means 114, the resilient means 114 pressing against a shoulder 143 of the recess and against the retractable bar 106. As a result, the bar is urged toward the push plate 102 and the stamps 108 are caused to extend from the push plate.

The resilient means 114 comprises a coil spring 152 which is disposed around the rod 112. The spring is compressed during operation.

In operation of the push unit 16, the unit moves in the direction of the wrapping unit 20 by means of the actuating arm 98, the rod 112 sliding in the guide plate 100. The stamps 108 are extended from the push plate 102 and impress a figure on the bar 48 as it is ejected from the die 38. At a point short of the forwardmost position of the push unit 16, the collar 116 on the rod 112 engages the guide plate 100, thereby limiting forward movement of the rod 112 and the connected retractable bar 106. Continued movement of the push unit 16 causes the stamp 108 connected to the bar to retract into the face of the push plate and when the push unit 16 is in the position shown in Figure 3, the stamps are wholly retracted and downward movement of the bar 48 does not mar the printed figure.

The various features of the invention believed new are set forth in the following claims.

I claim:

1. In a machine for forming and wrapping a bar of plastic material including a reciprocating push unit having a push plate which contacts the bar and moves the bar forwardly, a head which receives the bar and which moves across the face of the push plate during wrapping of the material when the push plate is in its forwardmost position, and a striker plate which wraps a portion of the wrapping material across a side of the bar immediately after being contacted by the face of the push plate, the improvement which comprises providing a push unit including a push plate which contacts the bar, said push plate having recesses formed therein, a retractable bar movable relative to said push plate, a stamp connected to said retractable bar, a mounting block supporting said push plate and said retractable bar, and resilient means biasing said retractable bar toward said push plate, said resilient means extending between said mounting block and said retractable bar; and means engaging the retractable bar after substantial forward movement of the push unit for moving said retractable bar relative to said push plate, said moving means including a connecting rod attached to said retractable bar and movable relative to said mounting block.

2. A molding machine for forming a plastic product into cakes, said machine including a mold; means to fill said mold with product; a ram to push the molded product from the mold; and power means operatively connected to said ram to move said ram in periodic strokes through said mold to eject the molded product therefrom; said ram including a holder having a pressure face with at least one opening through said face, stamping means normally extending through said opening, said stamping means being movable with respect to said face in a direction generally normal to said face, and means associated with said stamping means to restrain the movement of said stamping means as said ram approaches the end of its stroke.

References Cited in the file of this patent

UNITED STATES PATENTS

| | | |
|---|---|---|
| 886,936 | Brock | May 5, 1908 |
| 1,055,049 | Keyes | Mar. 4, 1913 |
| 1,129,111 | Moss | Feb. 23, 1915 |
| 1,292,850 | Moss | Jan. 28, 1919 |
| 1,522,545 | Ratliff | Jan. 13, 1925 |
| 1,545,513 | Peters | July 14, 1925 |
| 1,583,022 | Stanley | May 4, 1926 |
| 2,182,656 | Bruggimann | Dec. 5, 1939 |
| 2,186,914 | Shurley | Jan. 9, 1940 |
| 2,350,853 | Wheeler | June 6, 1944 |
| 2,356,951 | Runton | Aug. 29, 1944 |
| 2,592,793 | Coon | Apr. 15, 1952 |
| 2,641,178 | Wendt | June 9, 1953 |